(12) United States Patent
Winkler (10) Patent No.: US 8,827,055 B2
(45) Date of Patent: Sep. 9, 2014

(54) REVERSIBLE EMERGENCY BRAKING SYSTEM FOR MACHINE TOOLS

(75) Inventor: Thomas Winkler, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 461 days.

(21) Appl. No.: 12/736,328

(22) PCT Filed: Mar. 31, 2009

(86) PCT No.: PCT/EP2009/053783
§ 371 (c)(1),
(2), (4) Date: Dec. 13, 2010

(87) PCT Pub. No.: WO2009/121862
PCT Pub. Date: Oct. 8, 2009

(65) Prior Publication Data
US 2011/0088985 A1    Apr. 21, 2011

(30) Foreign Application Priority Data

Mar. 31, 2008   (DE) .......................... 10 2008 000 891

(51) Int. Cl.
*F16D 51/00* (2006.01)
*F16D 51/10* (2006.01)
*F16D 51/20* (2006.01)
*B23Q 11/00* (2006.01)
*F16D 127/00* (2012.01)

(52) U.S. Cl.
CPC ............ *B23Q 11/0092* (2013.01); *F16D 51/20* (2013.01); *F16D 2127/002* (2013.01)
USPC ............ 188/78; 188/72.1; 188/110; 188/137; 188/156; 188/184; 188/217; 192/114 R (58) Field of Classification Search
USPC .......... 188/78, 171, 184, 110, 137, 187, 72.7, 188/156; 192/105 CD, 103 B, 114 R
See application file for complete search history.

(56) References Cited

U.S. PATENT DOCUMENTS 2,755,396 A * 7/1956 Beardsley et al. .............. 310/77
3,576,242 A * 4/1971 Mumma ..................... 193/35 A
(Continued)

FOREIGN PATENT DOCUMENTS

| CN | 1279681 | 1/2001 |
|---|---|---|
| CN | 2507724 | 8/2002 |
| CN | 2609700 | 4/2004 |
| CN | 2680926 | 2/2005 |
| CN | 2681847 | 3/2005 |
| CN | 1789741 | 6/2006 |
| DE | 21 47 669 | 4/1972 |

(Continued)

OTHER PUBLICATIONS

"Cut Stop" (VDI/VDE/IT) by Institute fuer Wekzeugmaschiner (IFW) {Institute for Machine Tools] of the University of Stuttgart.

*Primary Examiner* — Anna Momper
*Assistant Examiner* — San Aung
(74) *Attorney, Agent, or Firm* — Kenyon & Kenyon LLP (57) ABSTRACT

An emergency braking system for a machine tool for the abrupt braking of a rotating shaft, including at least one brake drum and at least one brake shoe which are brought into engagement with each other in order to brake the shaft, the brake drum engaging with the brake shoe under the influence of a centrifugal force resulting from the rotation of a shaft. The present system is configured in such a way that at least one resetting device is provided which makes it possible to reset the brake shoes in the direction of their original position after braking has taken place.

15 Claims, 8 Drawing Sheets

(56) References Cited

U.S. PATENT DOCUMENTS

| | | | |
|---|---|---|---|
| 3,785,465 A * | 1/1974 | Johansson | 192/48.5 |
| 4,282,958 A * | 8/1981 | Zindler | 192/17 R |
| 4,531,617 A * | 7/1985 | Martin et al. | 187/373 |
| 4,573,556 A * | 3/1986 | Andreasson | 188/137 |
| 5,105,925 A * | 4/1992 | Tremaglio et al. | 192/224.1 |
| 2008/0142315 A1* | 6/2008 | Kim | 188/110 |

FOREIGN PATENT DOCUMENTS

| | | |
|---|---|---|
| DE | 87 08 955 | 12/1987 |
| DE | 195 36 995 | 4/1997 |
| TW | 264019 | 6/1994 |
| TW | 392541 | 10/1998 |
| TW | 494811 | 2/2001 |
| TW | 507611 | 12/2001 |
| TW | 284781 | 7/2005 |

* cited by examiner

REVERSIBLE EMERGENCY BRAKING SYSTEM FOR MACHINE TOOLS

FIELD OF THE INVENTION

The present invention relates to a protection system, particularly an emergency braking system for a machine tool, especially for a circular saw, that deploys its protective action within a very short time span lying usually in the range of a few milliseconds (typically 1 to 50 ms), in order to protect a user of the machine tool from injury in dangerous situations.

BACKGROUND INFORMATION

At present, essentially three different approaches exist for realizing such a protection system for circular-saw benches and format circular saws which are intended to prevent a user from coming into contact with the rotating saw blade or to suffer a serious cutting injury.

The protection system of an American manufacturer, carried and marketed under the trade name Saw Stop Inc., is an emergency braking system which permits braking of the machine tool on the basis of a direct engagement of a brake actuator system with the saw blade, as soon as a suitably designed sensor has detected a dangerous situation. In this case, by the use of a hot-wire trip element, a rotatably-mounted aluminum block is pushed with the aid of a pre-loaded spring into the toothing of the operating saw blade, the aluminum block wedging itself therein, and in this manner absorbing the rotational energy of all geometries of the machine tool rotating during the sawing process. As a secondary effect, this one-sided application of force on the cutting is used to sink the saw blade into the saw bench by way of a structurally specially-designed suspension device disposed on the saw bench. With the aid of this setup, it is possible to avert serious bodily injury to the machine-tool operator triggering the protective mechanism. The disadvantage in this case is the direct attack on the working tool, thus, on the cutting geometry of the saw blade, since the breakaway of parts of the toothing creates additional danger potential for the operator. In addition, in order to restore the preparedness of the protection system, it is necessary to replace the brake unit including the saw blade by a replacement unit ready for use, which the operator must stock up, in order to be able to continue working utilizing the protection function after a braking action has taken place. This is associated with considerable resultant costs and suitable expenditure of time for procurement and installation. In addition, it may be assumed that all component parts affected by the braking process, that is, all rotating geometries of the machine tool, are subject to great stress during the deceleration phase. Neither the manufacturer nor relevant publications concerning this system have data with regard to the long-term endurance of the device.

A further approach pursues the use of a protection system exclusively for sinking the saw blade into the saw bench without initiating a procedure for braking the saw blade. In this case, with the aid of a pyrotechnic priming charger, the saw blade, including the main shaft and its bearing, is moved out of the danger zone, so that serious injuries to the operator may be prevented. The disadvantage in this type of protection system is the necessity of moving relatively large masses in the form of assemblages to be lowered, under strict time requirements in the millisecond range. Furthermore, the pyrotechnic igniters thereby necessary, which prove to be imperative for this protection actuator system, give rise to a costly part reversibility which limits, both timewise and organizationally, an immediate continuation of work on the machine tool with a protection system ready for use. Furthermore, for reasons of limited space and very specific procedure, this protection system is only suitable for larger stationary devices like, for example, circular-saw benches which permit such a structure in their interior. However, this system has to be ruled out for use on smaller, hand-guided devices such as cross-cut and miter saws or panel saws.

A disclosure from a publicly sponsored project by the name of "Cut-Stop" (VDI/VDE/IT) with respect to a protection system for format circular saws by the Institut für Werkzeugmaschinen (IFW) (Institute for Machine Tools) of the University of Stuttgart discusses an approach which, with the aid of a special form of a disk brake system, namely, a self-amplifying wedge brake, brings the main shaft of the machine tool and therefore the saw blade to a standstill. In this case, a wedge is accelerated with the aid of a pyrotechnic igniter and subsequently pushed between a stationary wedge guide in the form of a modified brake caliper and the rotating brake disk. For the selection and combination of specific wedge angles $\alpha$ and brake-lining values $\mu$, the system works in self-locking fashion, so that the specific time demands on the braking procedure may be fulfilled with this design as a function of the mass inertia to be decelerated. However, the disadvantage of this protection system lies in the fact that in this case as well, as discussed in the cited publication, subsequent to the triggering of the protection actuator system, it is necessary to replace the complete braking unit because of the wedge jammed in the friction pairing. The expenditure of time needed for the scope of work to be carried out amounts to approximately 10-12 minutes for the complete restoration of the system preparedness. Therefore, a partial restriction of the immediate system reversibility holds true here, as well.

German patent document DE 195 36 995 A1 discusses a fail-safe brake for elevators which has a device that, in the event a predefined maximum speed of the means of transport is exceeded, brakes the drive with a speed-dependent deceleration and possibly also stops it. The fail-safe brake of DE 195 36 995 A1 acts directly, as a function of rotational speed, on the driving disk of the cable-operated conveying system and is able to limit its rotational speed. The fail-safe brake in the form of a centrifugal brake additionally has a device for amplifying the braking force as a function of the conveying speed.

SUMMARY OF THE INVENTION

An object of the exemplary embodiments and/or exemplary methods of the present invention is to provide a protection system for a machine tool, particularly a reversible protection system, having an alternative design that deploys its protective action within a few milliseconds, and at least partially eliminates the problems discussed at the outset.

To achieve this objective, the exemplary embodiments and/or exemplary methods of the present invention provides an emergency braking system, particularly a reversible emergency braking system, for the rapid braking of a rotating shaft of a machine tool, the emergency braking system having a brake drum and at least one brake shoe which are brought into engagement with each other under the influence of the centrifugal force or centrifugal acceleration resulting from the rotation of the shaft, in order to brake the shaft. According to the invention, after a purposive triggering of the braking system, it is reset again manually or automatically, so that the braking equipment enters into the state of readiness again, making the protective function on the device available once more.

The exemplary embodiments and/or exemplary methods of the present invention is targeted toward a completely reversible resetting of the braking system. This takes place after activation of the braking system has occurred, ideally without the replacement of component parts, so that the resultant costs arising in the case of different triggering/reset mechanisms may advantageously be minimized or prevented entirely.

When braking the machine tool, advantageously there is no direct intervention in the tool. Such an intervention would inevitably be associated with the destruction of the tool. The machine tool of the present invention brakes the shaft that directly or indirectly is driving the tool. In this manner, the tool itself remains undamaged. In particular, a reversible safety or braking device is thus possible.

In addition, the design of the exemplary embodiments and/or exemplary methods of the present invention realizes an electromechanical system without the use of further energy forms which would possibly jeopardize the complete reversibility and would mean a limitation for it.

After a system decision to reset the system, which may be an automatic decision of the system on the basis of sensor data of control electronics and/or a conscious manual action by the user who wants to put the system in operation again, the resetting arrangement is activated, which lead to a reversible resetting of the braking system.

Here, it may be useful and advantageous to integrate a certain dead time into the system, so that, for example, the braking system can be or is reset only after a few minutes have elapsed.

It is also conceivable to provide a circuit which only allows the braking system to be reset when the entire system, and particularly the machine tool having the braking system, has been switched off, taken off the network, and subsequently activated again.

In particular, it is useful and advantageous if the braking system is in a defined condition (braking condition) prior to the brake being reset. Starting from such a defined braking condition, a reproducible resetting, possibly even an automated resetting of the braking system may then be carried out.

To achieve such a defined initial state for the resetting of the braking system, it advantageously has a retaining device having one or more retaining elements. After a braking has taken place, this retaining device makes it possible to retain the brake shoes reliably and in defined manner in a braking position. Without a signal to reset the system, which may be provided by control electronics of the system, but also as a conscious action by the user, the system remains in this geometrically unique state, so that on one hand, the coupling elements are protected as the motor is running down, and on the other hand, the system is not unintentionally reset.

In one advantageous embodiment of the emergency braking system according to the present invention, the retaining device is therefore only able to be deactivated after the system decision to put the system into operation again.

Therefore, subsequent to a resetting, a new triggering is therefore possible immediately, which means the user is always protected at the device.

The resetting device is designed to be closely coordinated with the self-amplification of the friction pairing, and therefore with the geometry of the braking system. For example, the resetting device may be realized by the use both of suitably dimensioned tension-spring elements as well as compression-spring elements.

A locking device is adjustable between a locked position in which the brake shoe is retained on the brake-shoe holder, and an unlocked position in which the at least one brake shoe is released in such a way that it executes a swiveling motion in the direction of the brake drum in order to produce the braking engagement.

Advantageously only one locking or unlocking force must be used to activate the brake in the braking device according to the present invention, since the force necessary for the braking power is produced by centrifugal forces of the system.

Since the locking or unlocking force lies markedly below the braking forces needed, the locking may be deactivated, i.e., released very quickly, as well. This—together with a short braking time—leads to the very short time in the millisecond range (which typically lies in the range of 1 to 50 ms, advantageously in the range of 1 to 20 ms and particularly in the range of 10 ms and less) in which the braking system is able to brake the tool of a machine tool.

The locking device may include at least one locking element which is movable between a locked position in which it is engaged with the at least one brake shoe, and an unlocked position in which it is decoupled from the brake shoe. For instance, such a locking element may take the form of a locking pin or the like.

Advantageously, the retaining device, that is, the retaining elements for the defined positioning of the brake shoes in the braking position, may be formed on at least one of the locking elements.

The locking device advantageously includes an actuator which transfers the locking device out of the locked position into the unlocked position.

For example, this actuator may be a magnet actuator which pulls a ring armature to which a locking element in the form of a locking pin is attached, in order to disengage the locking pin from the brake shoe so that the brake shoe is released. Functionally, the actuator in the present case is in interaction with an armature, which may be in the form of an armature plate, which is attracted at the instant of the triggering. The all-round application of force on the plate thereby resulting permits a uniform pull without transverse forces, so that a possible tilting of the armature plate is prevented. Moreover, the energizing of the actuator and the attracting of the armature caused by it permit very short reaction times of the system.

In addition, the possibility exists of a centric mounting of the actuator relative to the braking system, which means with the aid of the design of the actuator as a pot magnet, the lead-through of a drive shaft, driven shaft or spindle into its center is made possible. This must be regarded as particularly advantageous.

Thus, for example, this actuator could also set the retaining element.

Alternatively, the retaining device may also be driven via a spring element.

The exemplary embodiments and/or exemplary methods of the present invention is targeted toward a completely reversible triggering of the braking system within the range of a few milliseconds. Thus, after activation has taken place, advantageously it is possible for the system to be triggered again by the same actuator. This prevents the accrual of resultant costs occurring in the case of other triggering mechanisms. The actuator may be durably designed in coordination with the necessary space conditions for the given requirements and thus in the ideal case, is maintenance-free.

Therefore, the exemplary embodiments and/or exemplary methods of the present invention is targeted toward the deceleration of the rotating shaft of the machine tool, which may be a circular-saw bench, a cross-cut and miter saw or a panel saw, for example, by using the available rotational energy of the rotating shaft with the aid of the design of a self-amplifying or self-locking friction pairing. In this manner, the predefined timeframe of the braking, which lies in the range of a few milliseconds, may be ensured. The form of the brake according to the present invention allows a tool, driven directly or indirectly by a shaft, to be braked in very short times typically in the range of 1 to 50 ms, advantageously in the range of 1 to 20 ms and particularly in the range of 10 ms and less.

In this context, it should be clear that the actual triggering of the braking procedure, which, for example, takes place as response to an output signal of a sensor that detects a dangerous situation for the user, may be accomplished mechanically, electromechanically, pyrotechnically, pneumatically or hydraulically, and in principle, is not tied to any specific medium; however, an electromechanical triggering may be used, because of a simple design and very good reversibility.

In addition, the emergency braking system may include a coupling device which is provided in such a way that in its coupled position, it connects the shaft to be braked to a drive train, and during an emergency braking, is automatically transferred into its decoupled position in which the drive shaft to be braked is decoupled from the drive train. Such a decoupling of the drive train during an emergency-braking process ensures that the drive train, which, for example, may have a drive shaft and any gear steps, is excluded from the actual braking procedure, which means the drive train is not subject to the great deceleration torques occurring during the braking procedure. This brings the advantage first of all, that components of the drive train cannot be damaged due to the braking process. Secondly, the geometries of the components on the drive end do not have to be adapted structurally to the requirements of the braking procedure, which is why they may be produced in a less robust and more inexpensive manner. In addition, a profitable reduction in the mass moment of inertia to be decelerated thereby results, since the components of the drive train do not have to be braked. Thus, the system load during the deceleration phase may be reduced decisively. Accordingly, the period of time necessary for braking the saw blade may be shortened substantially, while retaining the same action of force. Alternatively, the action of force may naturally also be reduced, accompanied by unaltered braking period.

According to one embodiment, the shaft to be braked is in the form of a hollow shaft, in whose hollow space a drive shaft of the drive train is positioned. In this case, the coupling device is advantageously formed by a protrusion, provided on the at least one brake shoe, which in the coupled position, grabs through a through-hole provided in the shaft to be braked, into a cutout in the drive shaft, so that the drive shaft and the shaft to be braked are joined in torsionally fixed fashion to each other, and which in the decoupled position, disengages from the cutout in the drive shaft, so that the shaft to be braked is no longer driven by the drive shaft. In this manner, the drive train may be decoupled during the braking process. The protrusion may engage with the cutout with form locking, a reliable engagement of the protrusion in the cutout thereby being attained. To this end, the protrusion may be arched, for example, and the cutout may be prism-shaped.

In addition, the exemplary embodiments and/or exemplary methods of the present invention relates to a machine tool having an emergency braking system of the type discussed above, the machine tool may be a saw, particularly a circular saw, more precisely, a circular-saw bench, a cross-cut and miter saw or a panel saw. Other machine tools, like in particular a drilling machine or grinding machine may be provided with the braking system of the present invention, as well.

However, it should be clear that the braking system of the present invention is also usable on other machine tools which, on specific occasion, have to rely on a purposefully triggerable deceleration within a given time frame in the range of a few milliseconds. An adaptation of this invention to another machine tool is possible in the individual case.

In the following, exemplary specific embodiments of the present invention are described in greater detail with reference to the accompanying drawing. The description, the associated figures as well as the claims contain numerous features in combination. One skilled in the art will consider these features, especially also the features of different exemplary embodiments, individually as well, and combine them to form useful, further combinations.

DETAILED DESCRIPTION

FIGS. 1 to 8 clarify the design of the emergency braking system according to the present invention in principle.

Figure 9:
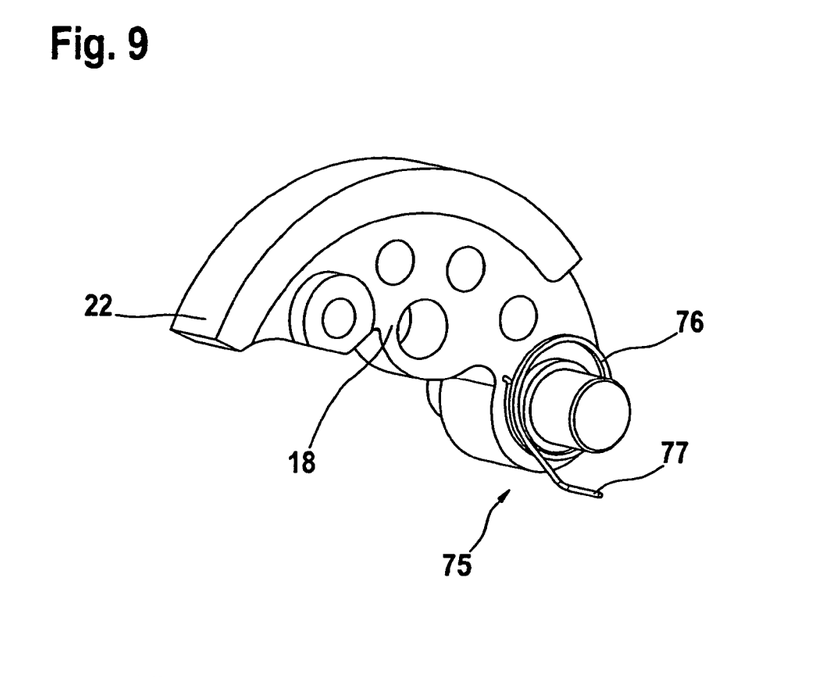
FIG. 9 shows an exemplary embodiment of the resetting device according to the present invention in the form of a resetting spring on a brake shoe of the apparatus.
Figure 10:
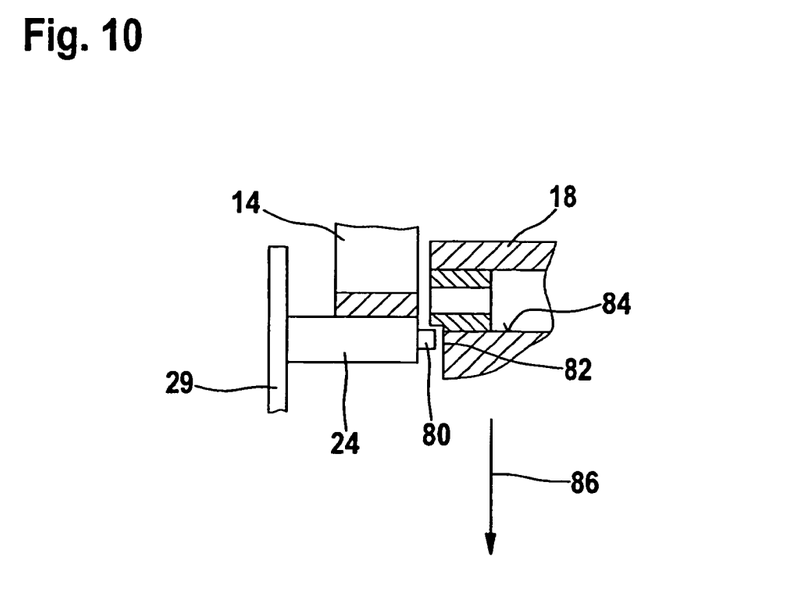
FIG. 10 shows a schematic drawing for the purpose of illustrating the retaining device according to the present invention.
Figure 11:
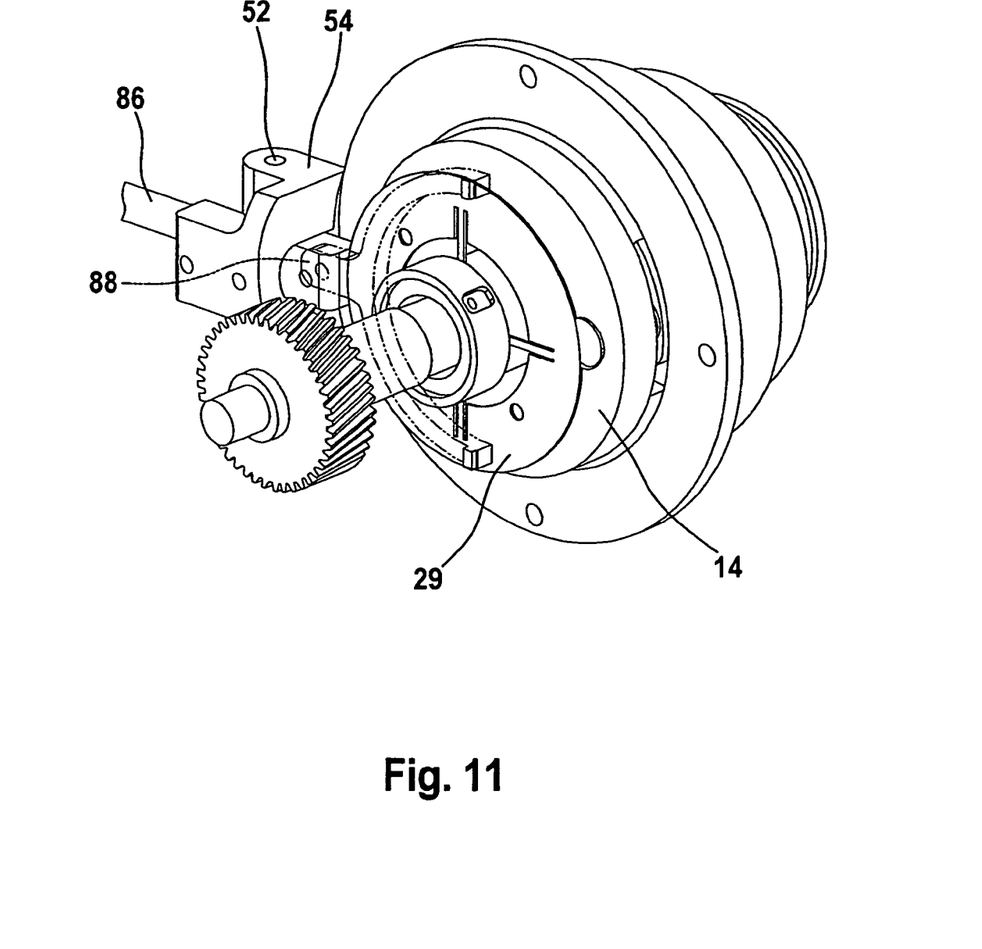
FIG. 11 shows a specific embodiment of a manual resetting device.

FIGS. 9, 10 and 11 are used to describe details of the resetting device according to the present invention of the braking system presented.

Figure 12:
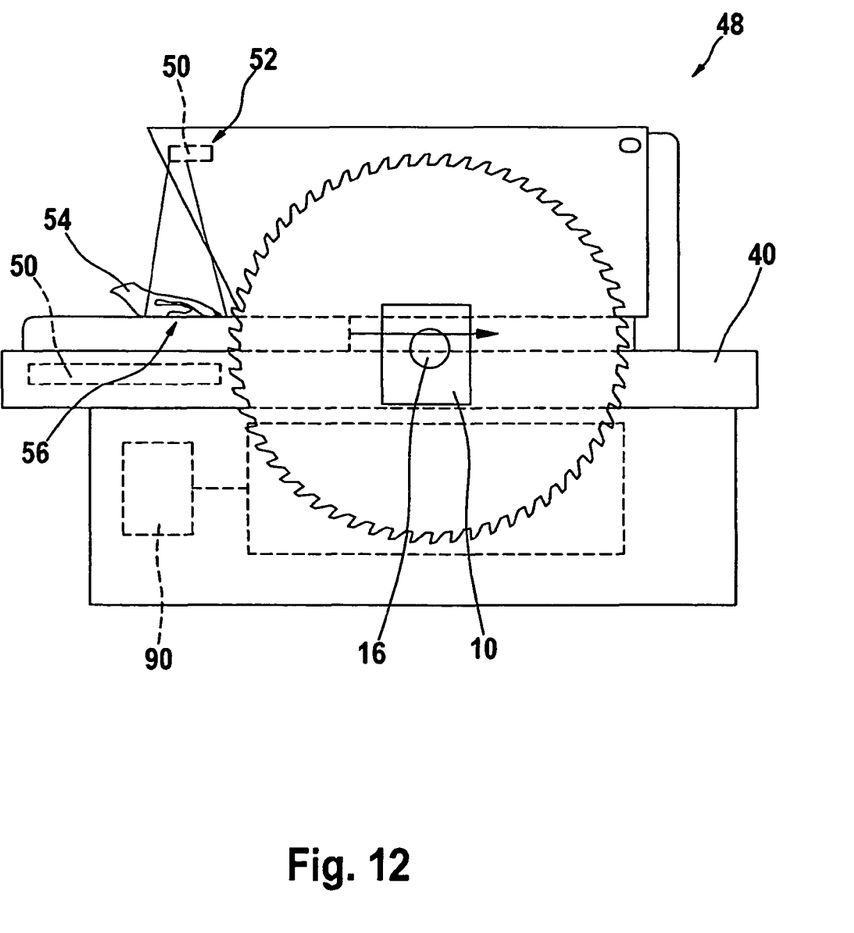
FIG. 12 shows an exemplary embodiment of a machine tool according to the present invention in the form of a circular-saw bench in a side view.
Figure 13:
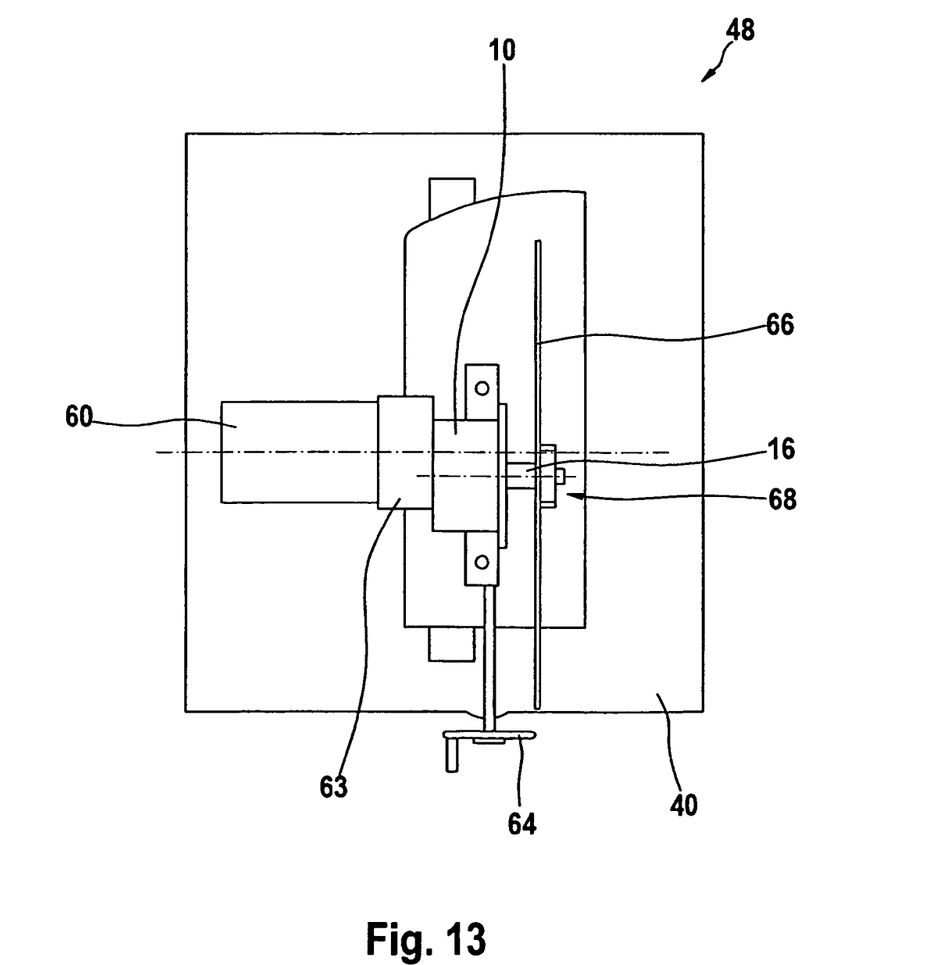
FIG. 13 shows an alternative exemplary embodiment of a machine tool according to the present invention in the form of a circular-saw bench in a top view.

FIGS. 12 and 13 show a machine tool of the present invention in the form of a circular-saw bench having an emergency braking system according to the present invention.

FIGS. 1 through 6 show schematic views of an emergency braking system according to one specific embodiment of the present invention, which overall is denoted by reference numeral 10, and which is used, for example, to bring a saw blade of a circular-saw bench (not shown here, see rather FIGS. 12 and 13) to a standstill in a dangerous situation within a very short period of time in the range of a few milliseconds.

Emergency braking system 10 includes a stationary brake drum 12 which is secured to a frame component (not further shown) of a saw, for example. This frame component must be designed structurally in such a way that it withstands the braking torques developing during the deceleration phase and is able to absorb them. Emergency braking system 10 also includes a brake-shoe holder 14 which is fixedly joined to a driven shaft 16 on the saw-blade side, so that it rotates with it in the direction of rotation identified by arrow 17. Secured to brake-shoe holder 14 are two brake shoes 18, situated diametrically opposite each other, which in each case are mounted in a manner allowing rotation about a swivel pin 20. Each brake shoe 18 is provided with a friction lining 22 on its surface facing brake drum 12, these friction linings 22 engaging with stationary brake drum 12 during a braking procedure of emergency braking system 10, so that friction linings 22 and brake drum 12 form a friction pairing.

Figure 1:
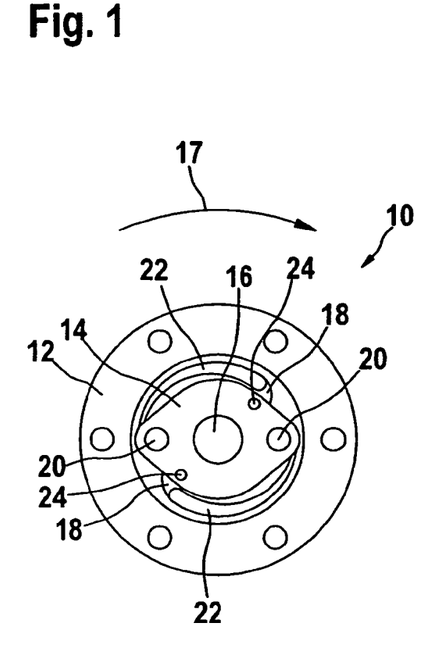
FIG. 1 shows a schematic front view of an emergency braking system according to one specific embodiment of the present invention in a state in which the braking procedure has not been triggered.
Figure 2:
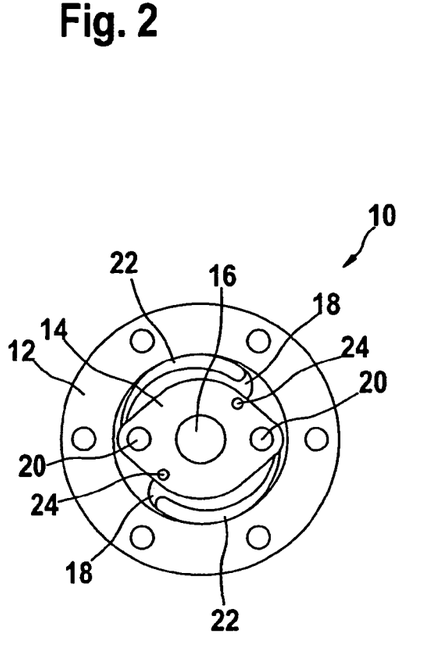
FIG. 2 shows a schematic front view of the emergency braking system depicted in FIG. 1 in a state in which the braking procedure has been triggered.

In the state shown in FIG. 1, in which the braking procedure has not yet been triggered, brake shoes 18 are retained securely on brake-shoe holder 14 with the aid of locking pins 24 of a locking device 26, so that they are unable to rotate about swivel pins 20. These locking pins 24 are part of locking device 26 which also has a magnet actuator 28 by which locking pins 24 are adjustable between a locked position in which brake shoes 18 are retained on brake-shoe holder 14, and an unlocked position in which brake shoes 18 are released in such a way that they execute a swiveling motion around their swivel pins 20 in the direction of brake drum 12, in order to produce the braking engagement between friction linings 22 and brake drum 12.

Figure 3:
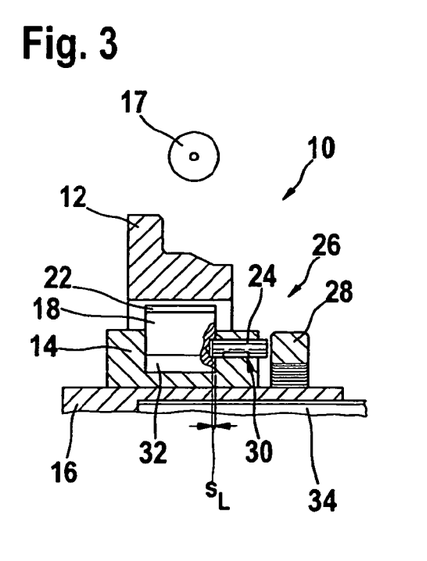
FIG. 3 shows a longitudinal-section view of the emergency braking system depicted in FIGS. 1 and 2 in a state in which the braking procedure has not been triggered.

As FIG. 3 shows, magnet actuator 28 of locking device 26 is fastened securely on driven shaft 16. Alternatively, magnet actuator 28 may also be secured on a stationary housing part (not shown), and act in non-contact fashion on locking pins 24. Locking pins 24, which are movable back and forth by magnet actuator 28, extend through through-holes 30 provided in brake-shoe holder 14, and in the state shown in FIGS. 1, 3 and 5 in which the braking procedure has not yet been initiated, engage in engagement openings 32 provided in each brake shoe 18. In this manner, brake shoes 18 are retained on brake-shoe holder 14.

Figure 4:
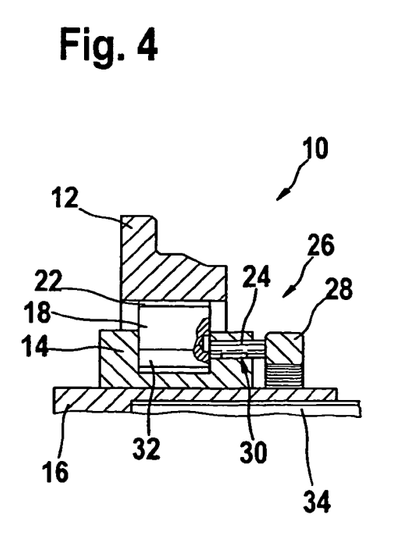
FIG. 4 shows a longitudinal-section view of the emergency braking system depicted in FIGS. 1 to 3 in a state in which the braking procedure has been triggered.
Figure 7:
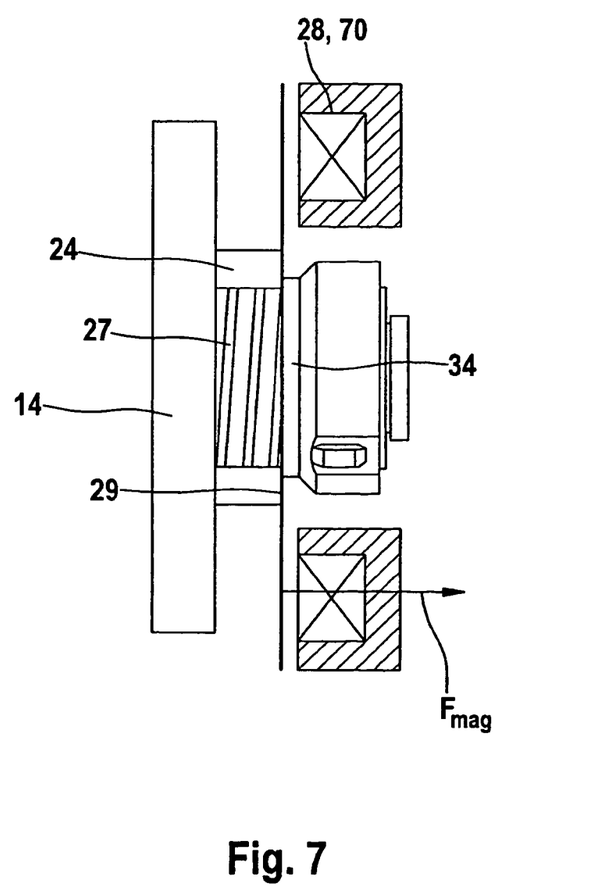
FIG. 7 shows a schematic representation of the actuator of the braking system according to the present invention.
Figure 8:
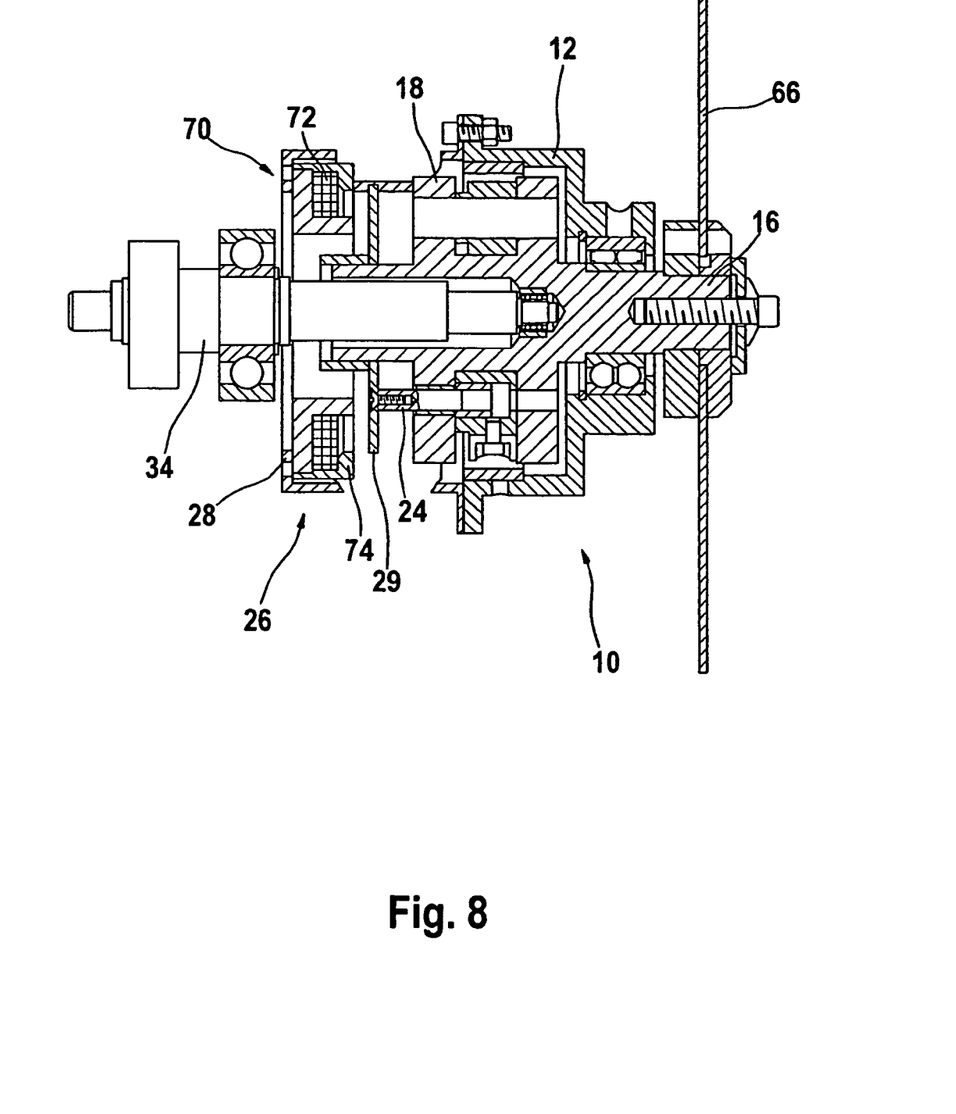
FIG. 8 shows a schematic representation of the braking system according to the present invention, including the locking device in a schematized sectional view.

In the event the braking system is triggered, magnet actuator 28 pulls a ring armature 29, on which locking pins 24 are secured, by a defined disengaging distance s out of brake-shoe holder 14, and thus releases brake shoes 18 (see FIGS. 4 and 8). As a result of the centrifugal forces or the centrifugal acceleration generated by rotating driven shaft 16, they come to lie against stationary brake drum 12, the friction pairing between friction linings 22 of brake shoes 18 and brake drum 12 needed to decelerate driven shaft 16 thereby being formed. Even though in the present exemplary embodiment, locking pins 24 are moved back and forth with the aid of magnet actuator 28, it should be pointed out that as an alternative, locking pins 24 may also be moved in one of the two moving directions under the influence of a spring force 27 or the like. Thus, the forward motion of locking pins 24 may take place under the influence of magnet actuator 28, while locking pins 24 are reset by one or more spring elements 27, or vice versa (see FIG. 7, for example).

Magnet actuator 28, driven in the case of triggering, is made up of a magnetic circuit 70, including coil 72 and magnetic yoke 74, which is able to be activated in the event of triggering. As illustrated particularly in FIGS. 3 and 7, armature 29 is placed at a defined distance from actuator 28. At the same time, this distance forms projection dimension $s_L$ of locking pins 24 in the braking system.

This armature 29 is able to be attracted by magnetic circuit 70 by way of a magnetic force $F_{mag}$, locking pins 24 of the braking system thereby performing an identical movement. Braking system 10 is activated in this manner. In this connection, magnet actuator 28 is always fixedly mounted, for example, on the housing, in order to be able to support force $F_{mag}$.

It goes without saying that magnet actuator 28 is activated by output signals of suitable sensors which detect a condition in which an operator is coming dangerously close to the saw blade of the circular-saw bench. Such sensors, which permit the detection especially of human tissue but also of other materials, may, for example and not definitively, be radar sensors, particularly UWB radar sensors (UWB=Ultra Wide Band) and/or also optical sensors, particularly NIR systems (NIR=Near Infra Red). Sensors of this kind are known in the related art, which is why they were not discussed in greater detail in the present description.

FIG. 8 shows the configuration of braking device 10 including locking device 26 in an overview.

Figure 5:
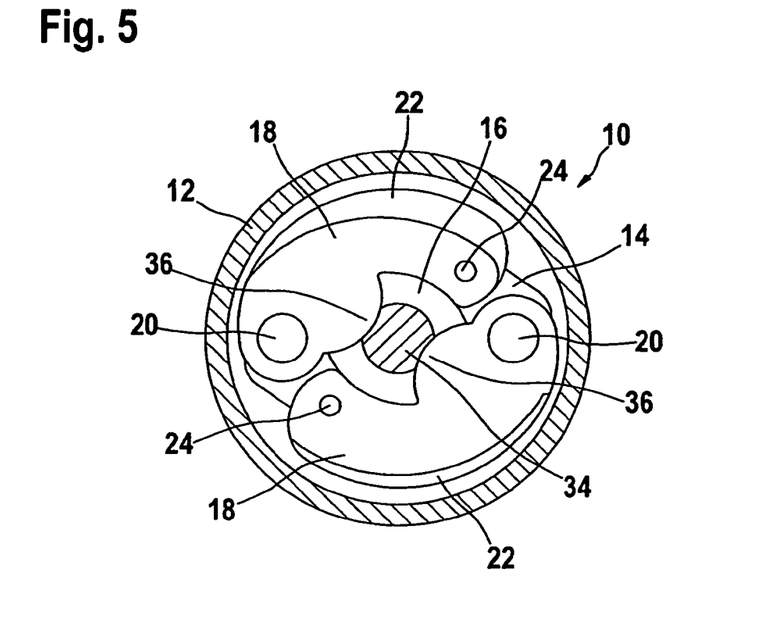
FIG. 5 shows a schematic cross-sectional view of the emergency braking system depicted in FIGS. 1 to 4 in a state in which the braking procedure has not been triggered.
Figure 6:
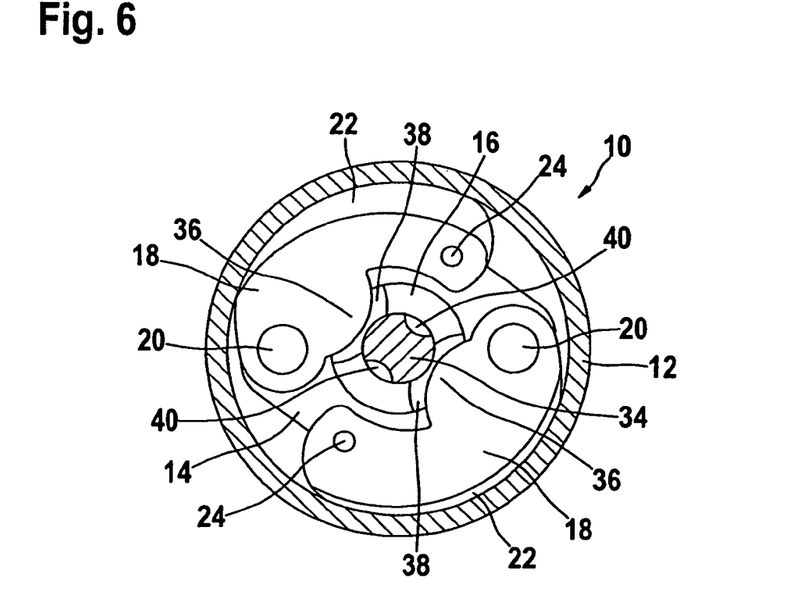
FIG. 6 shows a schematic cross-sectional view of the emergency braking system depicted in FIGS. 1 to 5 in a state in which the braking procedure has been triggered.

As shown particularly in FIGS. 5 and 6, as well, driven shaft 16 to be braked with the aid of emergency braking system 10 is in the form of a hollow shaft, in whose hollow space a drive shaft 34 is accommodated which forms a part of the drive train (not shown). In order to connect driven shaft 16 and drive shaft 34 in torsionally fixed manner to each other, arched protrusions 36 jutting out in the direction of the midpoint of driven shaft 16 and drive shaft 34 are formed on brake shoes 18, and in each case reach through through-holes 38, which are provided in driven shaft 16, and engage in prism-shaped cutouts 40 in drive shaft 34, as shown in FIG. 5. Due to the engagement of protrusions 36, provided on brake shoes 18, in corresponding cutouts 40 in drive shaft 34, driven shaft 16 and drive shaft 34 are joined to each other in torsionally fixed fashion.

If the braking procedure is initiated starting from the state shown in FIG. 5, then after locking pins 24 have been pulled out of brake shoes 18 by disengaging distance s, brake shoes 18 rotate about their respective swivel pins 20 in the direction of brake drum 12, so that protrusions 36 disposed on brake shoes 18 become disengaged from assigned cutouts 40 in drive shaft 34, drive shaft 34 thereby being decoupled from driven shaft 16. Due to this decoupling, the drive train is not subject to the deceleration torques generated during the braking procedure, so that it cannot be damaged. In addition, it is possible to construct the components of the drive train to be less robust, since they are not subject to any great stresses during the braking procedure. Thus, for example, the cross-section of drive shaft 34 on the motor side may be designed to be smaller than when no decoupling device is provided to decouple the drive train. However, the advantage resulting from this, that the number of components to be decelerated is reduced to a minimum, is decisive. This has a positive effect on the system load during the deceleration phase, as was already described before.

Amplification factor C* of the braking system is defined as a function of the geometrical dimensions of the design of the braking system; for the present set-up, it lies in the area of the self-amplification or the self-locking of the system. For this case of the self-amplification or the self-locking of the system, only a short impulse is needed to form the friction pairing, since brake shoes 18 are pressed against brake drum 12 as a result of the force balance occurring.

Furthermore, the amplification factor is defined as follows:

$$C^* = \frac{F_R}{F_{SP}} = \frac{\mu \cdot \tan\alpha}{\tan\alpha - \mu}$$

If factor $C^*$ is positive, then the forces act in the sense of direction assumed in the drawing. In this context, frictional force $F_R$ is yielded from tensioning force $F_{SP}$ amplified by factor $C^*$. For =tan, the equation for $C^*$ has a pole, so that this amplification factor tends to infinity. In this regard, the system state of an unstable balance virtually prevails. A negative amplification factor $C^*$ is obtained for the selection of the parameter tan <. This means a theoretical reversal of the sense of direction of tensioning force $F_{Sp}$, which would have to occur in order to maintain the force balance. In reality, this case indicates a special state of a self-amplifying system. In addition, the friction pad is pressed here against the moving belt by resulting frictional force F. Because of the steady, mutual increase in the frictional and normal forces thus developing, in the ideal case, static friction occurs within the friction pairing after a brief time. This leads as a result to the locking of the entire system. In this connection, one usually speaks of self-locking. In this context, forces advantageously occur which are greater than the forces imparted by the centrifugal force of the brake shoes.

As a function of relative coefficient of friction of the friction partners, angles α are thus obtained which denote areas in which self-amplification or self-locking occur. In this context, it could be advantageous to make the friction lining of at least one frictional or braking partner inhomogeneous.

Because of the use of a two-sided application of the frictional peripheral force of the friction pairing, the present roller bearings used are protected and do not have to be redesigned or even newly designed due to concerns of the durability of the overall system, whereby in turn an increased mass inertia would be introduced into the system.

Due to a configuration as described in the present case, in addition, rotating external geometries of the brake unit are avoided, which means an easy-to-encase, closed system having a compact construction may be realized, that additionally fits in positively as regards the special concerns of occupational safety in dealing with machine tools.

One possible resetting device or resetting arrangement shall be described in detail on the basis of one special embodiment variant which, however, does not represent the only conceivable form of the system.

In order to permit brake shoes 18 to arrive in key faces 40 of drive shaft 34 again, resetting springs 76, shown in FIG. 9, are provided as resetting elements of a resetting device 75. These resetting springs 76 may take the form both of compression springs and tension springs. After a braking has taken place, both brake shoes 18 may be moved back in the direction of drive shaft 34 with the aid of these spring elements 76, regardless of the position of driven shaft 16. At one end 77 of the springs, the resetting arrangement 76 are joined to brake-shoe holder 14. Thus, the resetting device generates a return force on the brake shoes in the direction of arrow 86. In this connection, the spring force is small compared to the centrifugal force—acting in the opposite direction—that initiates the braking, so that an influence of resetting arrangement 76 on the triggering time of the brake may be ignored.

However, it should be taken into consideration that because of the motor decoupling, drive shaft 34 continues to turn off, although the friction pairing has already decelerated driven shaft 16 to a standstill. Because of this, without the use of special construction elements, there would be the danger of a possible "coupling rattle" accompanied by premature wear of the formed elements during the running down of the motor.

A retaining device shown in FIG. 10 prevents this, in that a retaining element in the form of a retaining lug 80, which is provided as a functional element on locking pin 24, engages in a milled slot 82 on respective brake shoe 18 and thus retains it in the braking position. Without a signal to reset the system, which may be provided by control electronics (90) of the system (see, for example, FIG. 12), but also as a conscious action by the user, the system remains in this geometrically unique state, so that on one hand, the coupling elements are protected as the motor runs down, and on the other hand, no unintentional resetting of the system takes place.

If legal regulations should make a conscious resetting of the safety system by the user requisite, it may be advantageous to make resetting device 75 completely mechanical, so that the system reacts only to a conscious act by the user with regard to a resetting to a state of readiness.

Such a manual resetting device 75 suitable for this purpose is shown in FIG. 11. If reset lever 86 is moved by the user, this movement is transferred with the aid of a release fork 88 to armature plate 29 of the triggering system. For example, the reset lever may be moved via a pivot 52 on a housing mount 54. Thus, locking pins 24 are pulled once more, so that retaining elements 80 of locking pins 24 release brake shoes 18 again.

The reset force of leg springs 76 is thereby able to move brake shoes 18 in the direction of drive shaft 34, so that a positive engagement is able to take place again between the drive side and driven side of the system. Thus, spring-loaded locking pins 24 go into bore holes 84 of brake shoes 18 again, and the system enters into the state of readiness. Naturally, this reaction may also be brought about by the control electronics, so that an automatic resetting occurs after braking has taken place.

FIGS. 12 and 13 show exemplary embodiments of a machine tool according to the present invention, having an emergency braking system 10 and a sensor system 52 for detecting the presence of a type of material, particularly tissue like the human tissue of a hand. Circular saw 48 of FIG. 12, shown in a side view, is a circular-saw bench (benchtop system) and has a detection device 52 which is provided to detect the presence of a material type 54, particularly of tissue, for example, in a machine-tool working area 56. Device 52 for the detection has at least one sensor 50 that may be installed in a plane above the working area of the machine tool, as indicated in FIG. 10. Alternatively, sensor 50 of device 52 may also be integrated directly in workbench 40. Both possibilities may be realized both individually and simultaneously, as illustrated by way of example in FIG. 12. Device 52 for the detection especially of human tissue, but also of other materials, may include illustratively, and not definitively, radar sensors, particularly UWB radar sensors (UWB=Ultra Wide Band) and/or also optical sensors, particularly NIR systems (NIR=Near Infra Red).

Upon detection of a hand 54, for example, in the danger zone directly in front of the saw blade of the machine tool, an activity signal is generated which activates an actuator 28 that releases locking pins 24 of brake shoes 18 so that—as described in detail above—put in motion by the centrifugal force, they are propelled against brake drum 12 and initiate the braking process.

FIG. 13 shows the exemplary embodiment of a circular-saw bench 48 in a top view. A motor 60, by way of a gear unit 63, drives a tool which, in the exemplary embodiment of FIG. 13, is a saw blade 66. Saw blade 66 is secured on a driven shaft 16 by a clamping device 68. Emergency braking system 10 is disposed advantageously between gear unit 63 and shaft 16, that is, in the event of activation, it is made possible to decouple shaft 16 from driving gear unit 63. In the case of an emergency braking, an overloading of the gear stage is thereby avoided. The gear stage and motor shaft are then consequentially decoupled from each other.

Even though a circular-saw bench was selected as an example of a machine tool for the specific embodiment described above, it should be clear that the principle of the exemplary embodiments and/or exemplary methods of the present invention is applicable to other machine tools, as well.

Finally, it should be clear that the specific embodiment of the emergency braking system according to the present invention described above is in no way restrictive. Rather, modifications and alterations are possible without departing from the scope of protection of the present invention, which is defined by the accompanying description herein.

What is claimed is:

1. An emergency braking system for a machine tool, comprising:
    at least one brake drum;
    at least one brake shoe,
    at least one locking element having a locked position for preventing the at least one brake shoe from engaging the at least one brake drum and having an unlocked position wherein the at least one brake drum and the at least one brake shoe are brought into engagement with each other for the abrupt braking of a rotating shaft, the brake drum engaging with the brake shoe under the influence of a centrifugal force resulting from the rotation of a shaft; and
    at least one resetting device for resetting the brake shoes in the direction of their original position after a braking has taken place and placing the at least one locking element in the locked position.

2. The emergency braking system of claim 1, wherein a resetting arrangement of the resetting device is formed on the brake shoes.

3. The emergency braking system of claim 1, wherein a resetting arrangement of the resetting device is formed on the brake drum.

4. The emergency braking system of claim 1, wherein a resetting arrangement of the resetting device is able to be activated to reset the braking system after a system decision about putting the system into operation again.

5. The emergency braking system of claim 1, further comprising:
    at least one retaining device to retain the brake shoes in a defined braking position after a braking has taken place.

6. The emergency braking system of claim 5, wherein the retaining device has at least one retaining element which, in the braking position of at least one brake shoe, engages in the brake shoe.

7. The emergency braking system of claim 5, wherein the retaining device or at least one retaining element is disposed on the at least one locking element for locking the brake shoes.

8. The emergency braking system of claim 5, wherein the retaining device is deactivated after a system decision to put the system into operation again.

9. The emergency braking system of claim 1, wherein a resetting arrangement of the resetting device is driven automatically.

10. The emergency braking system of claim 1, wherein the resetting device has at least one elastic spring element.

11. The emergency braking system of claim 4, wherein a spring force of the spring element is less than the centrifugal force initiating the braking.

12. The emergency braking system of claim 1, wherein a resetting arrangement of the resetting device is driven manually.

13. A machine tool comprising:
    an emergency braking system for a machine tool for the abrupt braking of a rotating shaft, including:
    at least one brake drum;
    at least one brake shoe,
    at least one locking element having a locked position for preventing the at least one brake shoe from engaging the at least one brake drum and having an unlocked position wherein the at least one brake drum and the at least one brake shoe are brought into engagement with each other to brake the shaft, the brake drum engaging with the brake shoe under the influence of a centrifugal force resulting from the rotation of a shaft; and
    at least one resetting device for resetting the brake shoes in the direction of their original position after a braking has taken place and placing the at least one locking element in the locked position.

14. The machine tool of claim 13, wherein the machine tool is a circular-saw bench.

15. The machine tool of claim 13, wherein the at least one locking element is placed in the unlocked position in response to the detection of a dangerous situation.

* * * * *